(12) United States Patent
Mittal

(10) Patent No.: US 8,874,508 B1
(45) Date of Patent: Oct. 28, 2014

(54) SYSTEMS AND METHODS FOR ENABLING DATABASE DISASTER RECOVERY USING REPLICATED VOLUMES

(71) Applicant: Devavrat Mittal, Maharashtra (IN)

(72) Inventor: Devavrat Mittal, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 16 days.

(21) Appl. No.: 13/633,858

(22) Filed: Oct. 2, 2012

(51) Int. Cl.
*G06F 17/00* (2006.01)

(52) U.S. Cl.
USPC .......................................................... 707/610

(58) Field of Classification Search
CPC ............ G06F 11/2076; G06F 11/2082; G06F 17/30578; G06F 3/065; G06F 11/2023; G06F 17/30581; G06F 11/1471; G06F 11/1446; G06F 17/30575; G06F 2201/84
USPC .......................................................... 707/610
See application file for complete search history.

(56) References Cited

U.S. PATENT DOCUMENTS

| | | | |
|---|---|---|---|
| 7,617,369 B1 * | 11/2009 | Bezbaruah et al. ........ | 707/999.2 |
| 7,827,136 B1 * | 11/2010 | Wang et al. .................... | 707/610 |
| 7,831,550 B1 * | 11/2010 | Pande et al. ................... | 707/610 |
| 7,840,673 B1 * | 11/2010 | O'Crowley ................... | 709/226 |
| 2003/0208511 A1 * | 11/2003 | Earl et al. ...................... | 707/204 |
| 2008/0059738 A1 * | 3/2008 | Burr et al. ..................... | 709/203 |
| 2008/0228834 A1 * | 9/2008 | Burchall et al. .............. | 707/202 |
| 2009/0157766 A1 * | 6/2009 | Shen et al. .................... | 707/202 |
| 2010/0064168 A1 * | 3/2010 | Smoot et al. ...................... | 714/6 |
| 2010/0145909 A1 * | 6/2010 | Ngo .............................. | 707/611 |
| 2011/0099147 A1 * | 4/2011 | McAlister et al. ............ | 707/639 |
| 2011/0161295 A1 * | 6/2011 | Ngo .............................. | 707/639 |

OTHER PUBLICATIONS

Brandon Hoang et al., Using Crash-Consistent Snapshot Copies as Valid Oracle Backups, Oracle Technical Report, Jul. 2010, 54 pages.
Oracle Database, Backup and Recovery Advanced User's Guide, 10g Release 2 (10.2), Aug. 2008, 100 pages.
Oracle Data Guard, Concepts and Administration, 11g Release 2 (11.2), Feb. 2012, 100 pages.
Oracle Database, Concepts, 11g Release 2 (11.2), Sep. 2011, 26 pages.

* cited by examiner

*Primary Examiner* — Rehana Perveen
*Assistant Examiner* — Tiffany Thuy Bui
(74) *Attorney, Agent, or Firm* — ALG Intellectual Property, LLC

(57) ABSTRACT

A computer-implemented method for enabling database disaster recovery using replicated volumes. The method may include (1) identifying at least one primary volume that is replicated to at least one secondary volume and includes at least one database, (2) detecting an attempt by a database application to write to the database on the primary volume, (3) detecting a write to a transaction log of the database on the primary volume by the database application that updates the transaction log to reflect the write to the database on the primary volume, and (4) replicating the write to the transaction log to the secondary volume to enable the database application to failover to the secondary volume without replicating the write to the database to the secondary volume. Various other methods, systems, and computer-readable media are also disclosed.

20 Claims, 10 Drawing Sheets

SYSTEMS AND METHODS FOR ENABLING DATABASE DISASTER RECOVERY USING REPLICATED VOLUMES

BACKGROUND

As enterprises increasingly rely on and store large amounts of information in their day-to-day operations, database replication and recovery has become increasingly important. Failure of a database may result in significant losses of productivity and/or significant financial losses. Thus, the true cost of a database failure may be proportional to the amount of time the database is unavailable. Accordingly, timely recovery of failed databases may be critical for many enterprises.

One traditional method of replicating databases may include maintaining a primary database on a primary server and a standby database on a standby server. In this method, the standby database is structurally identical to the primary database and is kept synchronized with the primary database. In the event of a failure of the primary database, the standby database may take on the role of the primary database. Unfortunately, maintaining active standby databases and servers using this method may be costly.

Another method of replicating databases may include replicating the volumes that store databases. For example, a database may be stored to volumes on a primary server, using this method the volumes on the primary server may be replicated to volumes on a secondary server. In the event of a failure of the database on the primary server, the database may be brought online on the secondary server. Unfortunately, this method of replicating databases has traditionally required that all data associated with the database (e.g., data files, transaction logs, archived transaction logs, control files, etc.) be replicated to the secondary server even though much of this data may be redundant. Accordingly, the instant disclosure identifies and addresses a need for additional and improved systems and methods for enabling database disaster recovery using replicated volumes.

SUMMARY

As will be described in greater detail below, the instant disclosure generally relates to systems and methods for enabling database disaster recovery using replicated volumes.

In one example, a computer-implemented method for enabling database disaster recovery using replicated volumes may include (1) identifying at least one primary volume that is replicated to at least one secondary volume and that includes at least one database, (2) detecting an attempt by a database application to write to the database on the primary volume, (3) detecting a write to a transaction log of the database on the primary volume by the database application, wherein the write to the transaction log updates the transaction log to reflect the write to the database on the primary volume, and (4) replicating the write to the transaction log to the secondary volume to enable the database application to failover to the secondary volume without replicating the write to the database to the secondary volume.

In some embodiments, the step of replicating the write to the transaction log to the secondary volume may include replicating a control file of the database to the secondary volume that indicates how the transaction log should be used to roll forward the replicated database on the secondary volume prior to failing over the database application to the secondary volume.

In certain embodiments, the method may further include (1) detecting a failure of the database application, (2) recovering, in response to detecting the failure of the database application, the write to the database to the secondary volume by rolling forward the replicated database on the secondary volume using the replicated write to the transaction log on the secondary volume, and (3) failing over, upon recovering the write to the database, the database application to the secondary volume.

In one embodiment, the method may further include enabling, prior to failing over the database application to the secondary volume, the database application to failback to the primary volume without rolling back the database on the primary volume by (1) intercepting the write to the database on the primary volume and the write to the transaction log on the primary volume, (2) buffering the write to the database and the write to the transaction log to a replication buffer, (3) determining that the write to the transaction log has been replicated to the secondary volume, and (4) flushing, in response to the determination, the write to the database and the write to the transaction log to the primary volume.

Failure of the database may occur before the write to the database and the write to the transaction log have been flushed to the primary volume. In some embodiments, the method may further include resynchronizing, after failing over the database application to the secondary volume, the primary volume with the secondary volume by (1) discarding writes buffered to the replication buffer and (2) replicating transaction logs on the secondary volume that were updated on the secondary volume after failing over the database application to the secondary volume to the primary volume to enable the database application to failback to the primary volume by rolling forward the database on the primary volume using the replicated transaction logs.

In certain embodiments, the method may further include (1) receiving a request to failback the database application to the primary volume, (2) rolling forward, in response to the request, the database on the primary volume using the replicated transaction logs, and (3) failing back, upon rolling forward the database on the primary volume, the database application to the primary volume.

In at least one embodiment, the method may further include (1) receiving a request to create a snapshot of the primary volume and (2) creating, in response to the request to create the snapshot of the primary volume, the snapshot of the primary volume and a snapshot of the replication buffer.

In other embodiments, the method may further include (1) detecting an overflow of the replication buffer and (2) creating, in response to detecting the overflow of the replication buffer, a snapshot of the primary volume to enable resynchronization of the primary volume with the secondary volume after failing over the database application to the secondary volume by rolling forward the database on the primary volume from the snapshot of the primary volume.

In some embodiments, the method may further include (1) tracking, in response to detecting the overflow of the replication buffer, updates to transaction logs on the primary volume and (2) replicating updated transaction logs to the secondary volume.

In various embodiments, the method may further include (1) detecting that the database application has archived the transaction log on the primary volume by creating a copy of the transaction log on the primary volume and (2) archiving, in response to detecting that the database application has archived the transaction log on the primary volume, the replicated transaction log on the secondary volume by creating a copy of the replicated transaction log on the secondary volume.

In certain embodiments, replication of the write to the transaction log to the secondary volume may be performed by a volume-replication application using block-level replication.

In one embodiment, a system for implementing the above-described method may include (1) an identification module programmed to identify at least one primary volume that is replicated to at least one secondary volume and that includes at least one database, (2) a database module programmed to detect an attempt by a database application to write to the database on the primary volume, (3) a transaction module programmed to detect a write to a transaction log of the database on the primary volume by the database application that updates the transaction log to reflect the write to the database on the primary volume, (4) a replication module programmed to replicate the write to the transaction log to the secondary volume to enable the database application to failover to the secondary volume without replicating the write to the database to the secondary volume, and (5) at least one processor configured to execute the identification module, the database module, the transaction module, and the replication module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify at least one primary volume that is replicated to at least one secondary volume and that includes at least one database, (2) detect an attempt by a database application to write to the database on the primary volume, (3) detect a write to a transaction log of the database on the primary volume by the database application that updates the transaction log to reflect the write to the database on the primary volume, and (4) replicate the write to the transaction log to the secondary volume to enable the database application to failover to the secondary volume without replicating the write to the database to the secondary volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
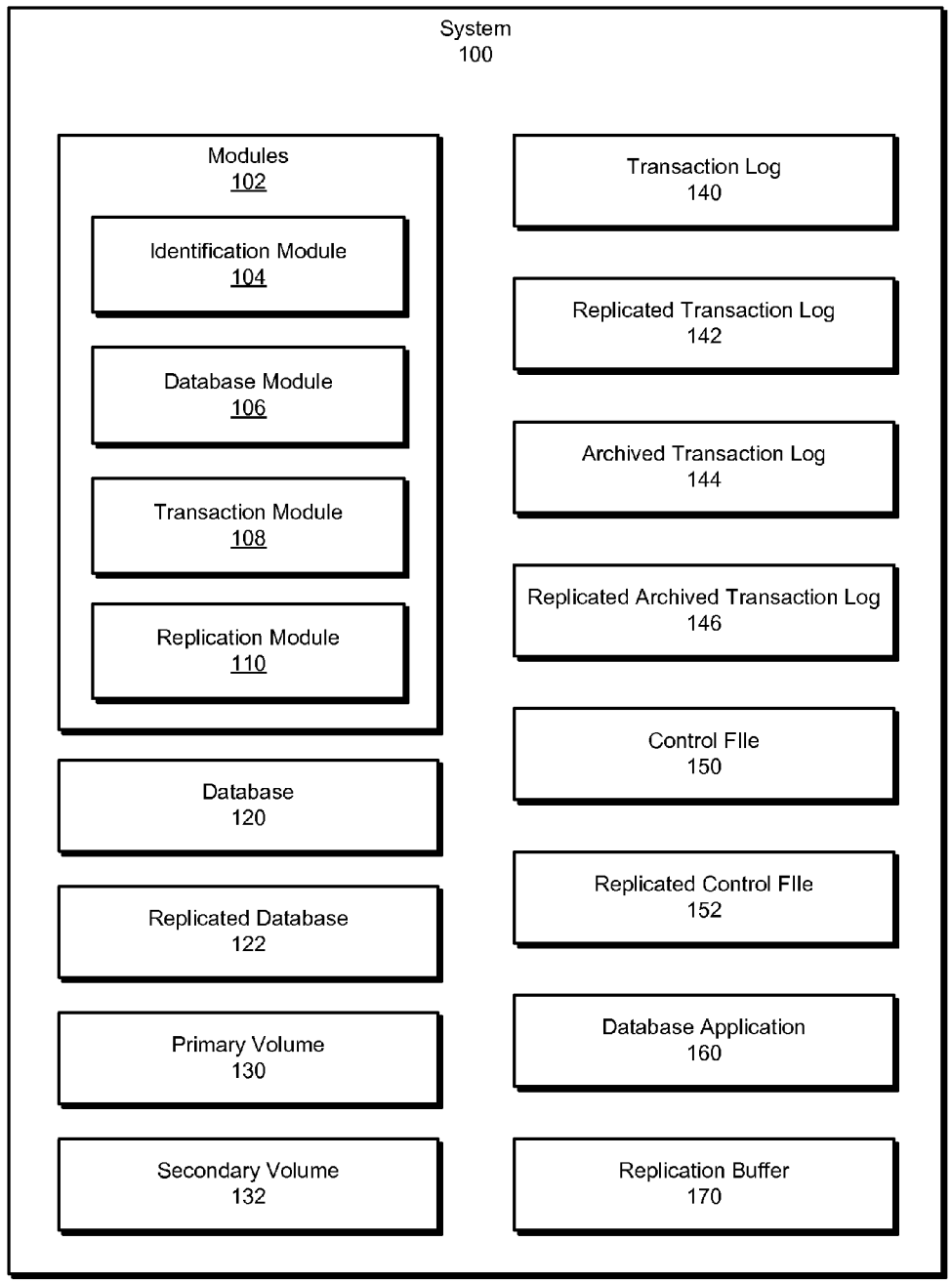
FIG. 1 is a block diagram of an exemplary system for enabling database disaster recovery using replicated volumes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling database disaster recovery using replicated volumes. As will be explained in greater detail below, by selectively replicating primary volumes containing database components to secondary volumes, the systems and methods described herein may reduce the amount of data that is replicated to secondary volumes to enable a database to be quickly and efficiently recovered from the secondary volumes. For example, by selectively replicating only changes to transaction logs on primary volumes to secondary volumes, the systems and methods described herein may enable database applications to failover to secondary volumes without needing to replicate changes to the databases associated with these transaction logs. Furthermore, in some examples, by ensuring that writes to databases and/or transaction logs are first committed to secondary volumes before they are committed to primary volumes, these systems and methods may enable databases to be quickly and efficiently recovered from the primary volumes.

The following will provide, with reference to FIGS. 1, 2, 4, and 7, detailed descriptions of exemplary systems for enabling database disaster recovery using replicated volumes. Detailed descriptions of corresponding computer-implemented methods will also be provided in connection with FIGS. 3, 5, 6, and 8. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for enabling database disaster recovery using replicated volumes. As illustrated in this figure, exemplary system 100 may include one or more modules 102 for performing one or more tasks. For example, and as will be explained in greater detail below, exemplary system 100 may include an identification module 104 programmed to identify at least one primary volume that is replicated to at least one secondary volume and includes at least one database. Exemplary system 100 may also include a database module 106 programmed to detect an attempt by a database application to write to the database on the primary volume.

In addition, and as will be described in greater detail below, exemplary system 100 may include a transaction module 108 programmed to detect a write to a transaction log of the database on the primary volume by the database application that updates the transaction log to reflect the write to the database on the primary volume. Exemplary system 100 may also include a replication module 110 programmed to replicate the write to the transaction log to the secondary volume to enable the database application to failover to the secondary volume without replicating the write to the database to the secondary volume. Although illustrated as separate elements, one or more of modules 102 in FIG. 1 may represent portions of a single module or application. For example, one or more of modules 102 in FIG. 1 may represent a block-level volume-replication application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., server 202 and/or server 206), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases, such as database 120 and replicated database 122. In one example, database 120 and replicated database 122 may be configured to store database data managed by a database application. For example, database 120 and replicated database 122 may represent one or more files (e.g., an ORACLE DATAFILE) that contain database data and/or objects (e.g., database tables, database indexes, etc.). In various examples, replicated database 122 may represent a partial or complete copy of database 120 that has been replicated (e.g., transmitted) to a secondary location. In at least one example, database 120 and/or replicated database 122 may also represent other files and data associated with a database and/or a database application.

Database 120 may also represent portions of a single database or computing device or a plurality of databases or computing devices. For example, database 120 may represent a portion of server 202 in FIG. 2, computing system 910 in FIG. 9, and/or portions of exemplary network architecture 1000 in FIG. 10. Alternatively, database 120 in FIG. 1 may represent one or more physically separate devices capable of being accessed by a computing device, such as server 202 in FIG. 2, computing system 910 in FIG. 9, and/or portions of exemplary network architecture 1000 in FIG. 10

As illustrated in FIG. 1, exemplary system 100 may also include a primary volume 130 and a secondary volume 132 configured to store one or more databases, transaction logs, archived transaction logs, control files, and/or replication buffers.

As illustrated in FIG. 1, exemplary system 100 may also include one or more transaction logs, such as transaction log 140, replicated transaction log 142, archived transaction log 144, and replicated archived transaction log 146. Transaction log 140 and replicated transaction log 142 may represent a log (e.g., an ORACLE REDO LOG) configured to record changes (e.g., committed changes or pending changes) to a database (e.g., database 120 or replicated database 122). In one example, transaction log 140 and replicated transaction log 142 may be used to roll forward a database from a backup or snapshot of the database. Transaction log 140 and replicated transaction log 142 may also represent one or more files (e.g., an ORACLE REDO LOG FILE) used to record changes to a database. In various examples, replicated transaction log 142 may represent a partial or complete copy of transaction log 140 that has been replicated (e.g., transmitted) to a secondary location.

Archived transaction log 144 and replicated archived transaction log 146 may represent a transaction log (e.g., transaction log 140 or replicated transaction log 142) that has been archived. In one example, archived transaction log 144 and replicated archived transaction log 146 may each represent a copy of a transaction log. For example, archived transaction log 144 may represent a copy of transaction log 140, and replicated archived transaction log 146 may represent a copy of replicated transaction log 142. Archived transaction log 144 and replicated archived transaction log 146 may also represent one or more files (e.g., an ORACLE ARCHIVED REDO LOG FILE) used to archive a transaction log.

As illustrated in FIG. 1, exemplary system 100 may also include one or more control files, such as control file 150 and replicated control file 152. In one example, control file 150 and replicated control file 152 represent one or more files that indicate how transaction logs and archived transaction logs should be used to roll forward a database from a backup, snapshot, or copy. For example, as will be explained in greater detail below, replicated control file 152 may indicate how replicated transaction log 142 and/or replicated archived transaction log 146 may be used to roll forward replicated database 122 prior to failing over database application 160 to secondary volume 132. In at least one example, control file 150 and replicated control file 152 may represent one or more ORACLE CONTROL FILES.

As illustrated in FIG. 1, exemplary system 100 may also include one or more database applications, such as database application 160. In various examples, database application 160 may represent an application (e.g., ORACLE DATABASE or IBM DB2) used to interact, manage, and/or modify a database.

Figure 2:
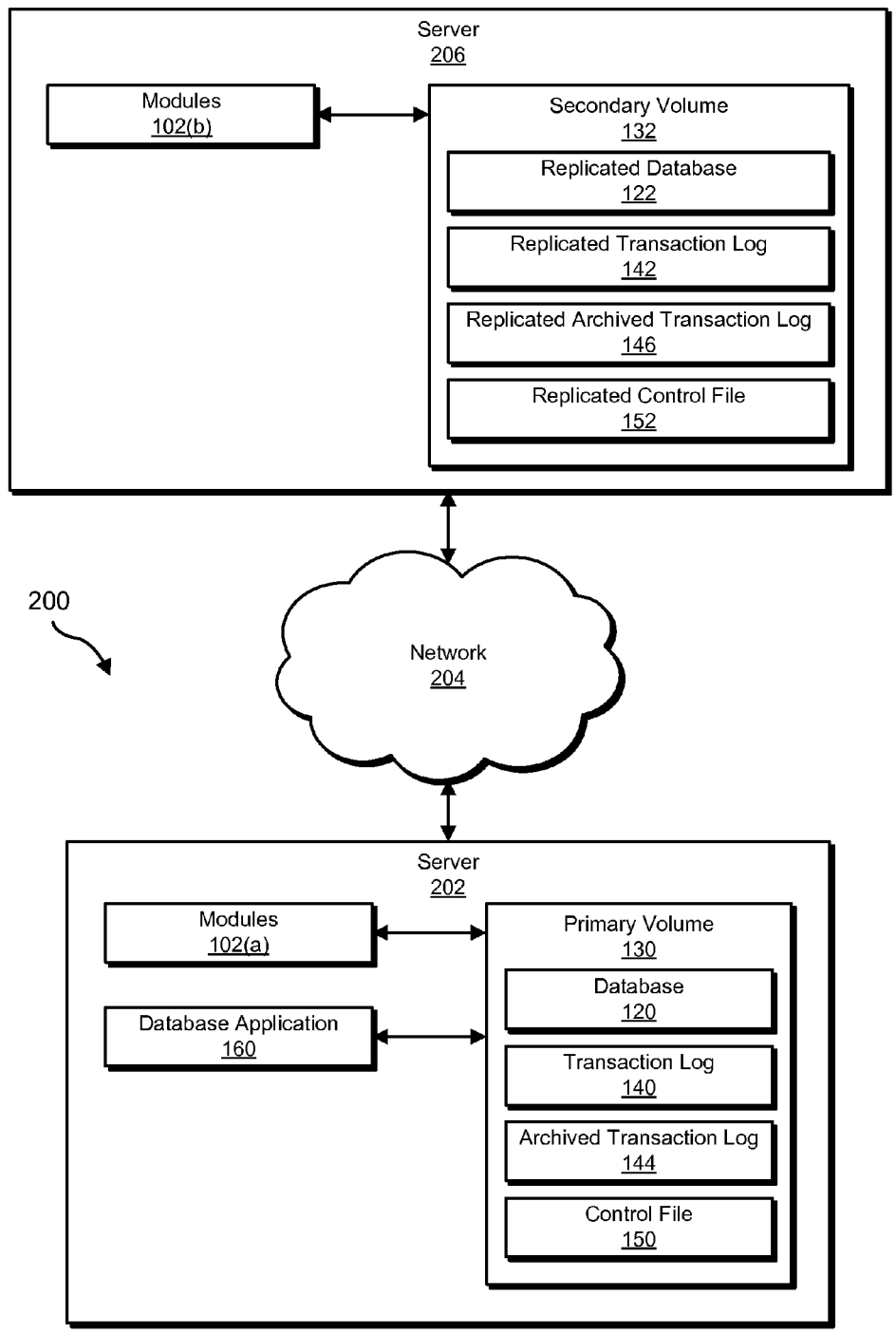
FIG. 2 is a block diagram of an exemplary system for enabling database disaster recovery using replicated volumes.

Exemplary system 100 in FIG. 1 may be implemented in a variety of ways. For example, all or a portion of exemplary system 100 may represent portions of exemplary system 200 in FIG. 2. As shown in FIG. 2, system 200 may include a server 202 in communication with a server 206 via a network 204. Server 202 and/or server 206 may be programmed with one or more of modules 102 and/or may store all or a portion of the data in database 120 and/or replicated database 122.

In one embodiment, one or more of modules 102 from FIG. 1 may, when executed by at least one processor of server 202 and/or server 206, facilitate server 202 and/or server 206 in enabling database disaster recovery using replicated volumes. For example, and as will be described in greater detail below, one or more of modules 102 may cause server 202 and/or server 206 to (1) identify at least one primary volume (e.g., primary volume 130) that is replicated to at least one secondary volume (e.g., secondary volume 132) and includes at least one database (e.g., database 120), (2) detect an attempt by a database application (e.g., database application 160) to write to the database on the primary volume, (3) detect a write to a transaction log (e.g., transaction log 140) of the database on the primary volume by the database application that updates the transaction log to reflect the write to the database on the primary volume, and (4) replicate the write to the transaction log to the secondary volume to enable the database application to failover to the secondary volume without replicating the write to the database to the secondary volume.

Servers 202 and 206 generally represent any type or form of computing device that is capable of reading computer-executable instructions. Examples of servers 202 and 206 include, without limitation, application servers and database servers configured to provide various database services and/or run certain software applications. Additional examples of servers 202 and 206 may include, without limitation, laptops, tablets, desktops, servers, cellular phones, Personal Digital Assistants (PDAs), multimedia players, embedded systems, combinations of one or more of the same, exemplary computing system 910 in FIG. 9, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1000 in FIG. 10, or the like. Network 204 may facilitate communication or data transfer using wireless or wired connections. In one embodiment, network 204 may facilitate communication between server 202 and server 206.

Figure 3:
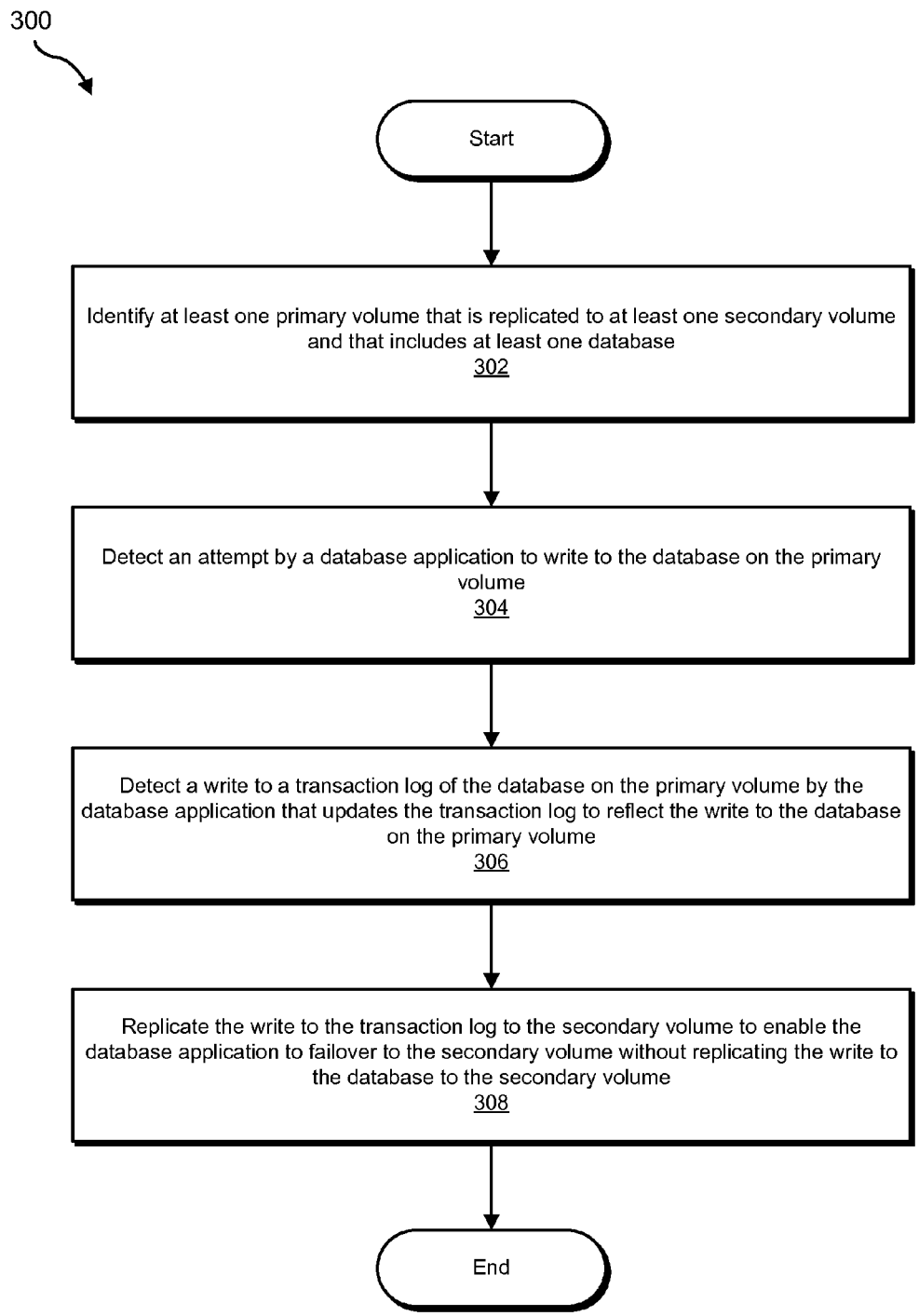
FIG. 3 is a flow diagram of an exemplary method for enabling database disaster recovery using replicated volumes.

FIG. 3 is a flow diagram of an exemplary computer-implemented method 300 for enabling database disaster recovery using replicated volumes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, computing system 910 in FIG. 9, and/or portions of exemplary network architecture 1000 in FIG. 10.

At step 302, one or more of the systems described herein may identify at least one primary volume that is replicated to at least one secondary volume and that includes at least one database. For example, at step 302 identification module 104 may, as part of server 202 in FIG. 2, identify primary volume 130 that is replicated to secondary volume 132 and that includes database 120.

The systems described herein may perform step 302 in any suitable manner. In one example, identification module 104 may identify primary volume 130 by examining a database or replication configuration file. In another example, identification module 104 may represent a portion of a volume-replication application that enables an administrator to indicate primary volume 130, database 120, and/or secondary volume 132 and configure replication of primary volume 130 to secondary volume 132.

In at least one example, identification module 104 may identify one or more primary volumes used by a database application to store database components (e.g., databases, transaction logs, control files, etc.) and may initially replicate the one or more primary volumes to one or more secondary volumes. As a result of this initial replication, the one or more primary volumes and the one or more secondary volumes may contain identical data. For example, identification module 104 may perform an initial complete replication of primary volume 130 to secondary volume 132. For example, identification module 104 may create a copy of database 120 (e.g., replicated database 122), transaction log 140 (e.g., replicated transaction log 142), archived transaction log 144 (e.g., replicated archived transaction log 146), and control file 150 (e.g., replicated control file 152) on secondary volume 132.

As will be explained in greater detail below, the systems and methods described herein may subsequently replicate modifications to primary volume 130 to secondary volume 132 in a selective manner. For example, changes to transaction log 140, archived transaction log 144, and control file 150 on primary volume 130 may be replicated to replicated transaction log 142, replicated archived transaction log 146, and replicated control file 152 on secondary volume 132, while changes to database 120 on primary volume 130 may not be replicated to replicated database 122 on secondary volume 132. In this example, as will be explained in greater detail below, replicated database 122 on secondary volume 132 may be rolled forward to the state of database 120 on primary volume 130 using replicated transaction log 142, replicated archived transaction log 146, and/or replicated control file 152.

As used herein, the term "volume" may refer to storage on one or more computer-readable storage mediums (e.g., a portion or portions of one or more physical disks) capable of storing database components. In various examples, a volume may include and be organized by at least one file system. The term volume may also refer to any volume that may be managed by a volume manager (e.g., VERITAS VOLUME MANAGER) or replicated by a volume replicator (e.g., VERITAS VOLUME REPLICATOR). In at least one example, a volume may appear to a database application as a physical disk partition.

The term "volume" may also refer to a set of volumes to which a database application stores its database and database components. For example, a database application may store control files to one volume, data files to another volume, transaction logs to yet another volume, and archived transaction logs to still another. In this example, the term volume may include the group of volumes that stores the control files, the data files, the transaction logs, and the archived transaction logs.

The term "primary volume", as used herein, may generally refer to a volume that is used to store a database and/or associated other database components and that is replicated to a secondary volume. For example, a primary volume may include at least a portion of the storage available to a primary database server (e.g., server 202 in FIG. 2). In this example, to ensure that data stored within the database will not be lost and/or to ensure that the database will remain accessible after a failure of the primary volume, the database and/or associated other database components on the primary volume may be replicated to a secondary volume, which may be a portion of the storage available to a standby database server (e.g., server 206 in FIG. 2).

As used herein, the term "replication" may generally refer to the process of copying or mirroring data from one volume to another. Volumes may be replicated in a variety of ways. In one example, each block of a volume may be independently replicated to another volume. In another example, each file within a volume may be independently replicated to another volume.

At step 304, one or more of the systems described herein may detect an attempt by a database application to write to the database on the primary volume. For example, at step 304 database module 106 may, as part of server 202 in FIG. 2, detect an attempt by database application 160 to write to database 120 on primary volume 130. As used herein, the term "database" may generally refer to any collection of data that is organized by and/or accessible via a database application and/or one or more files that store this data (e.g., an ORACLE DATAFILE).

The systems described herein may perform step 304 in any suitable manner. In one example, database module 106 may monitor database 120 on primary volume 130 and detect any committed and/or uncommitted changes to database 120. In another example, database module 106 may represent a portion of a volume manager that communicates directly (e.g., via a storage or database application programming interface) with a database application and/or that provides storage to the database application. For example, database module 106 may manage writes to and reads from primary volume 130 for database application 160. In this example, database module 106 may detect the attempt by database application 160 to write to database 120 on primary volume 130 by receiving a request from database application 160 to write to database 120 on primary volume 130.

In some instances, a database application 160 may not immediately write a change to database 120 to primary volume 130. For example, database application 160 may record a pending write to database 120 to transaction log 140 of database 120 prior to actually committing the write to database 120. In these instances, database module 106 may detect the attempt by database application 160 to write to database 120 on primary volume 130 by detecting a write to transaction log 140 of database 120 on primary volume 130 by database application 160.

At step 306, one or more of the systems described herein may detect a write to a transaction log of the database on the primary volume by the database application that updates the transaction log to reflect the write to the database on the primary volume. For example, at step 306 transaction module 108 may, as part of server 202 in FIG. 2, detect a write to transaction log 140 of database 120 on primary volume 130 by database application 160 that updates transaction log 140 to reflect the write to database 120.

As used herein, the term "transaction log" may generally refer to one or more logs (e.g., an ORACLE ONLINE REDO LOG) or files (e.g., an ORACLE ONLINE REDO LOG FILE) that record transactions pending on a database (e.g., committed and uncommitted changes to the database) and/or one or more logs or files that may be used to roll forward a database from a previous state and/or roll back a database to a previous state. For example, transaction logs may be applied to a backup of a database to bring current the backup of the database.

The systems described herein may perform step 306 in any suitable manner. For example, step 306 is similar to step 304, therefore, the discussion of step 304 may also apply to step 306.

Figure 4:
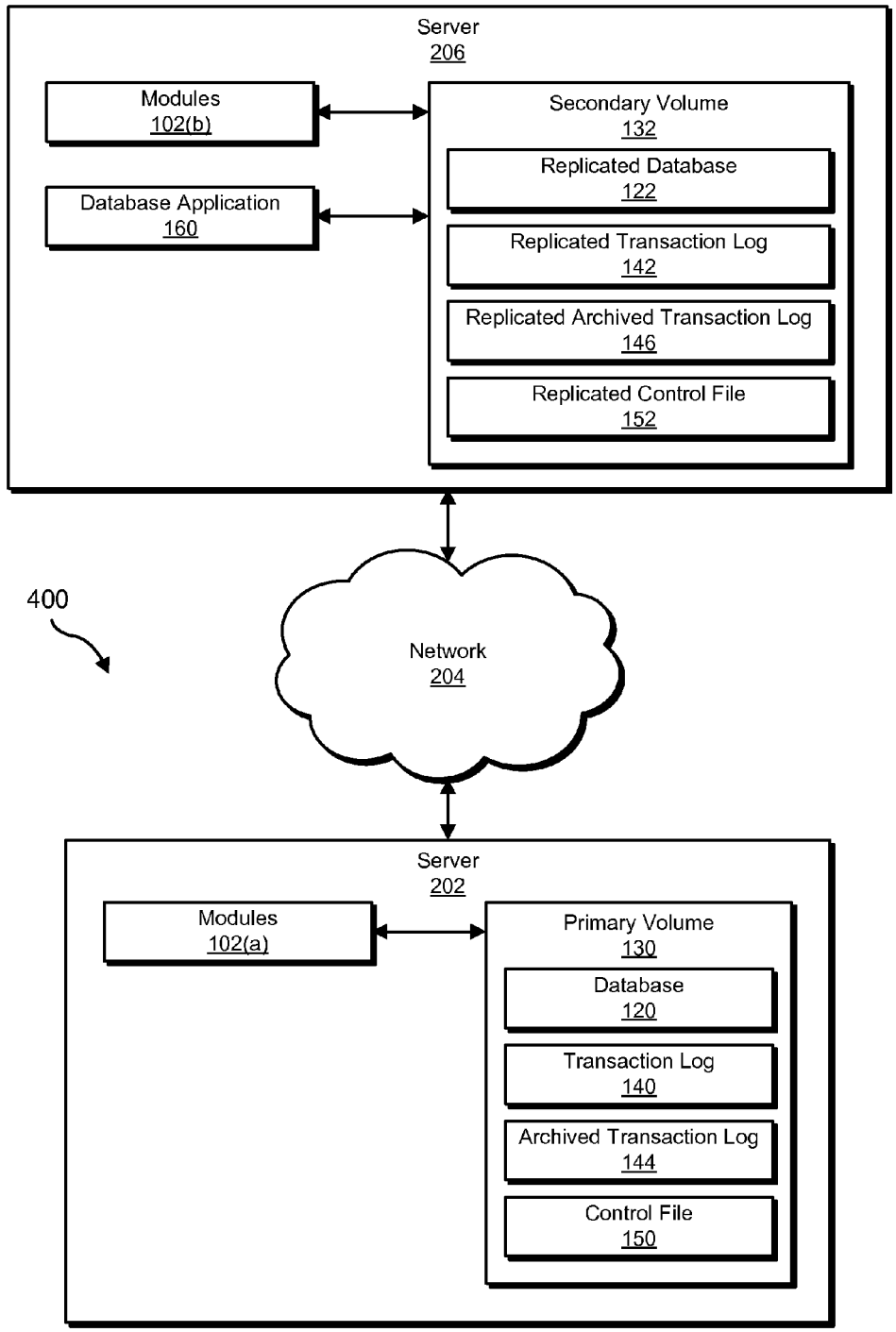
FIG. 4 is a block diagram of an exemplary system for enabling database disaster recovery using replicated volumes.

At step 308, one or more of the systems described herein may replicate the write to the transaction log to the secondary volume to enable the database application to failover to the secondary volume without replicating the write to the database to the secondary volume. For example, at step 308 replication module 110 may, as part of server 202 in FIG. 2, replicate the write to transaction log 140 to secondary volume 132 to enable database application 160 to failover to secondary volume 132 (e.g., as shown in FIG. 4) without replicating the write to database 120 to secondary volume 132.

The systems described herein may perform step 308 in any suitable manner. For example, replication module 110 may replicate the write to transaction log 140 on primary volume 130 by duplicating or mirroring the write to replicated transaction log 142 on secondary volume 132. In one example, replication module 110 may mirror the write to transaction log 140 on primary volume 130 to replicated transaction log 142 on secondary volume 132 by identifying one or more blocks on primary volume 130 that have been modified by the write to transaction log 140 and mirroring these modifications to corresponding blocks on secondary volume 132. For example, replication module 110 may identify one or more modified blocks on primary volume 130, transmit these modified blocks to server 206, and store the modified blocks to secondary volume 132. In this way, replication module 110 may ensure that replicated transaction log 142 is kept in sync with transaction log 140.

In some examples, replication module 110 may synchronously replicate the write to transaction log 140 to secondary volume 132. In other examples, replication module 110 may asynchronously replicate the write to transaction log 140 to secondary volume 132. In at least one example, replication module 110 may replicate the write to transaction log 140 to replicated transaction log 142 in the same order that the write was written to transaction log 140.

In at least one example, replication of the write to transaction log 140 to secondary volume 132 may be performed by a volume-replication application using block-level replication. For example, a volume-replication application may be configured to replicate primary volume 130 to secondary volume 132. In this example, replication module 110 may cause the volume-replication application to replicate the write to transaction log 140 to secondary volume 132 while also causing the volume-replication application to not replicate the write to database 120 to secondary volume 132.

Some database applications may use control files to record how transaction logs should be used to roll forward a database. For example, an ORACLE CONTROL FILE may be used to roll forward an ORACLE DATABASE without resetting its transaction logs. In these instances, replication module 110 may replicate a control file of the database to the secondary volume as needed as part of replicating the write to a transaction log. In one example, replication module 110 may replicate control file 150 to secondary volume 132 after detecting that control file 150 has been written to by database application 160 and/or otherwise modified.

Some database applications may also periodically archive transaction logs. For example, some database applications record transactions to one of several fixed-size transaction log files. After a transaction log file fills up and before the transaction log file is reused, the database application will archive the transaction log file by creating an archived transaction log file from the transaction log file. In these scenarios one or more of the systems described herein may track the archival of transaction logs on the primary volume and, in response to detecting that a transaction log has been archived, archive an associated replicated transaction log on the secondary volume.

In one example, replication module 110 may (1) detect that database application 160 has archived transaction log 140 on primary volume 130 by creating a copy of transaction log 140 (e.g., by creating archived transaction log 144) on primary volume 130 and (2) archive replicated transaction log 142 on secondary volume 132 by creating a copy of replicated transaction log 142 (e.g., by creating archived transaction log 144) on secondary volume 132. To illustrate, replication module 110 may, as part of server 202 in FIG. 2, detect that database application 160 has archived transaction log 140 on primary volume 130 and transmit a message to another instance of replication module 110 on server 206 indicating that transaction log 140 has been archived and/or that replicated transaction log 142 should be archived. In response to receiving the message sent from server 202, replication module 110 may, as part of server 206 in FIG. 2, archive replicated transaction log 142 on secondary volume 132 by creating a copy of replicated transaction log 142 (e.g., archived transaction log 144) on secondary volume 132. Upon completion of step 308, exemplary method 300 in FIG. 3 may terminate.

Figure 5:
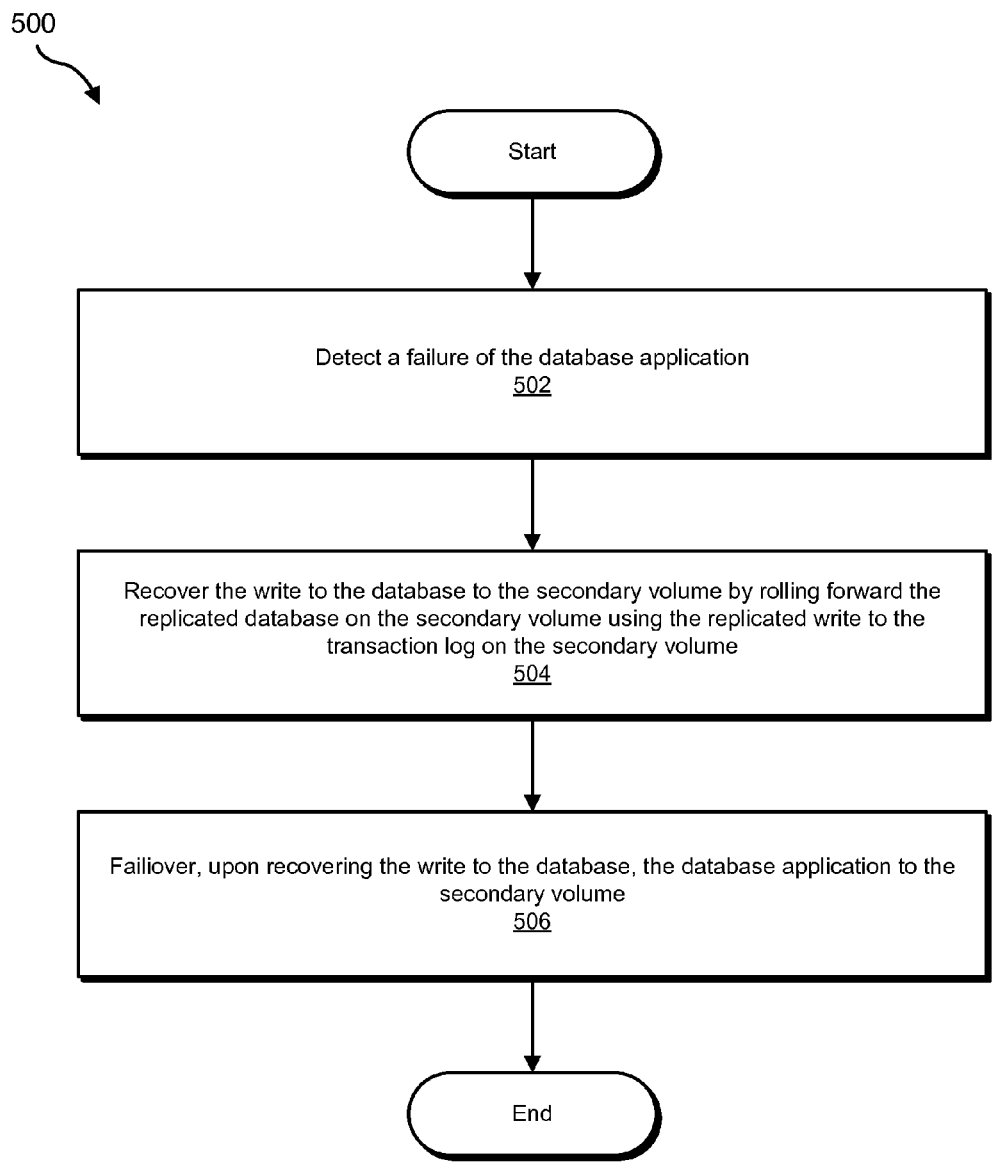
FIG. 5 is a flow diagram of an exemplary method for enabling database disaster recovery using replicated volumes.

FIGS. 4 and 5 illustrate how one or more of the systems described herein may failover a database application from a primary volume to a secondary volume in response to a failure of the database application and/or the primary volume. The following discussion of FIGS. 4 and 5 provides an example of how, upon detecting the failure of database application 160 on server 202 in FIG. 2, one or more of the systems described herein may failover database application 160 to secondary volume 132 on server 206 as illustrated by exemplary system 400 in FIG. 4.

FIG. 5 is a flow diagram of an exemplary computer-implemented method 500 for enabling database disaster recovery using replicated volumes. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, system 400 in FIG. 4, computing system 910 in FIG. 9, and/or portions of exemplary network architecture 1000 in FIG. 10.

At step 502, one or more of the systems described herein may detect a failure of the database application. For example, at step 502 database module 106 may, as part of server 202 in FIG. 2, detect a failure of database application 160.

The systems described herein may perform step 502 in any suitable manner. In one example, database module 106 may determine that database application 160 has failed by determining that server 202, database application 160, primary volume 130, and/or database 120 has failed or become inaccessible. In another example, database module 106, as part of server 206 or a monitoring server, may periodically query server 202 and/or database application 160 for status updates and may determine that database application 160 has failed as a result of receiving a status indicating that database application 160 has failed or as a result of receiving no status in response to the query.

At step 504, one or more of the systems described herein may recover the write to the database to the secondary volume in response to detecting the failure of the database application by rolling forward the replicated database on the secondary volume using the replicated write to the transaction log on the secondary volume. For example, at step 504 database module 106 may, as part of server 206 in FIG. 2, recover the write to database 120 to secondary volume 132 by rolling forward replicated database 122 on secondary volume 132 using the replicated write to transaction log 140 (e.g., replicated transaction log 142) on secondary volume 132.

The systems described herein may perform step 504 in any suitable manner. As mentioned above in an example at step 302, identification module 104 may have performed an initial replication of primary volume 130 to secondary volume 132. At that point in time, database 120, transaction log 140, archived transaction log 144, and control file 150 may have been identical to replicated database 122, replicated transaction log 142, replicated archived transaction log 146, and replicated control file 152, respectively. Thereafter, database application 160 on server 202 may have updated (e.g., written to) database 120, transaction log 140, archived transaction log 144, and/or control file 150.

Thereafter as mentioned above at step 308, replication module 110 may have selectively replicated updates to transaction log 140, archived transaction log 144, and control file 150 while not replicating updates to database 120. For this reason at the moment database application 160 failed, replicated transaction log 142, replicated archived transaction log 146, and replicated control file 152 may have been virtually identical (depending on the method of replication) to transaction log 140, archived transaction log 144, and control file 150, respectively. On the other hand, replicated database 122 may have remained unchanged since being initial replicated. In this example, database module 106 may roll forward replicated database 122 to the state of database 120 using replicated transaction log 142, replicated archived transaction log 146, and replicated control file 152. Database module 106 may roll forward replicated database 122 to the state of database 120 by applying the writes to database 120 recorded to replicated transaction log 142 and/or replicated archived transaction log 146 according to replicated control file 152. After database module 106 has rolled forward replicated database 122 to the state of database 120, replicated database 122 may be virtually identical to database 120 and be ready to failover database application 160 to secondary volume 132.

At step 506, one or more of the systems described herein may failover the database application to the secondary volume upon recovering the write to the database. For example, at step 506 database module 106 may, as part of server 206 in FIG. 2, failover database application 160 to secondary volume 132. The systems described herein may perform step 506 in any suitable manner. In one example, database module 106 may failover database application 160 to secondary volume 132 by configuring database application 160 to read and write to replicated database 122, replicated transaction log 142, and replicated control file 152 on secondary volume 132 and bringing online database application 160 on server 206 as illustrated in FIG. 4. Upon completion of step 506, exemplary method 500 in FIG. 5 may terminate.

Figure 6:
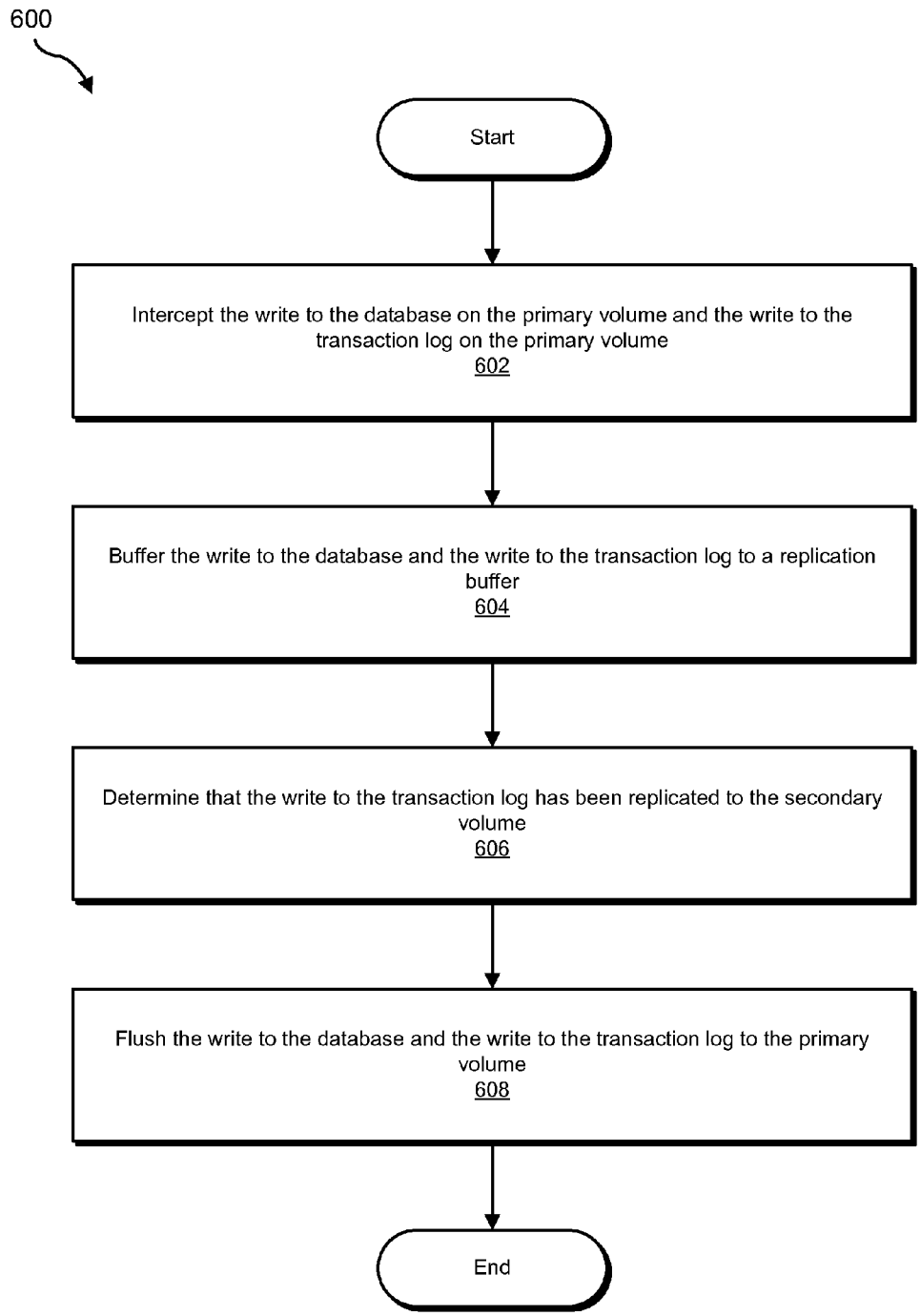
FIG. 6 is a flow diagram of an exemplary method for enabling database disaster recovery using replicated volumes.
Figure 7:
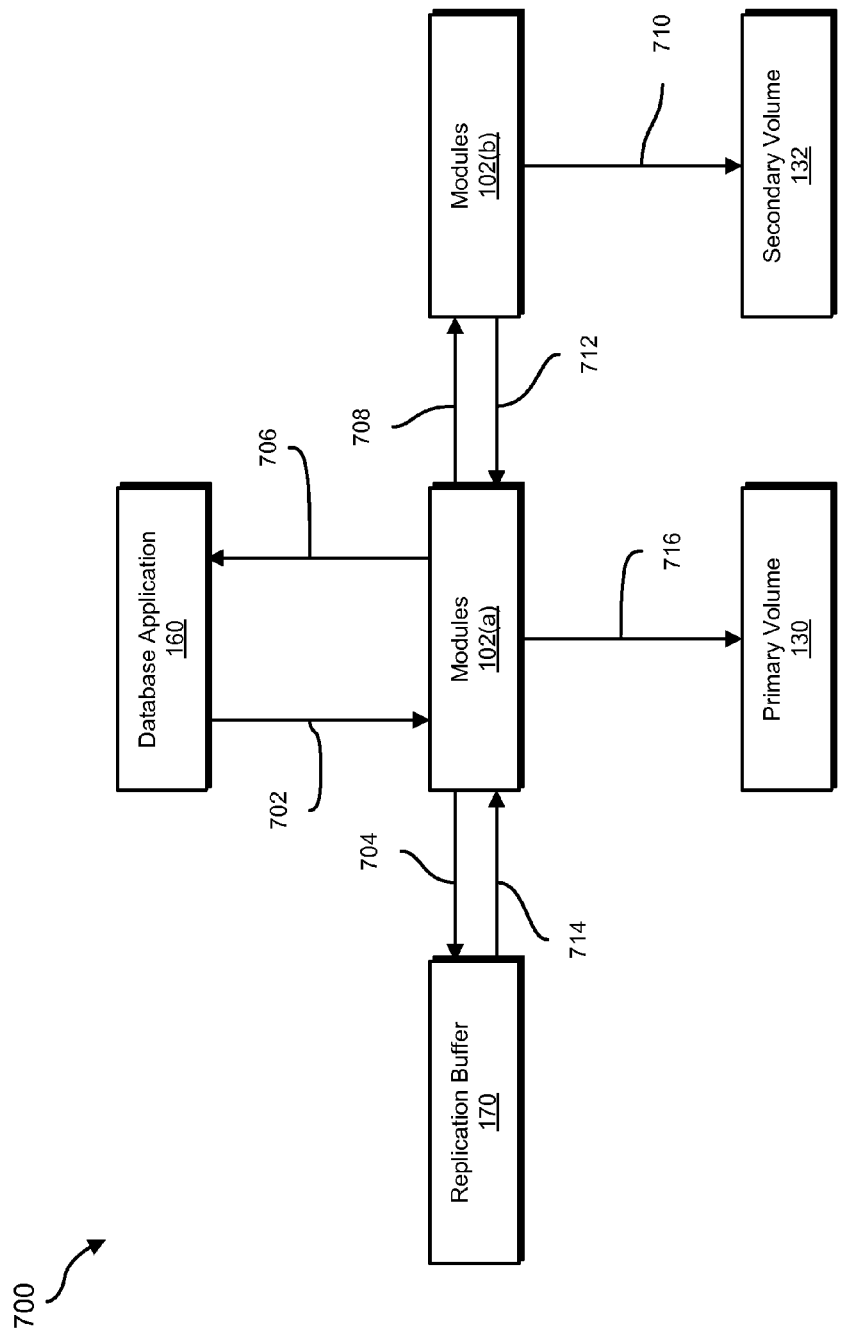
FIG. 7 is a flow diagram of an exemplary system for enabling database disaster recovery using replicated volumes.
Figure 8:
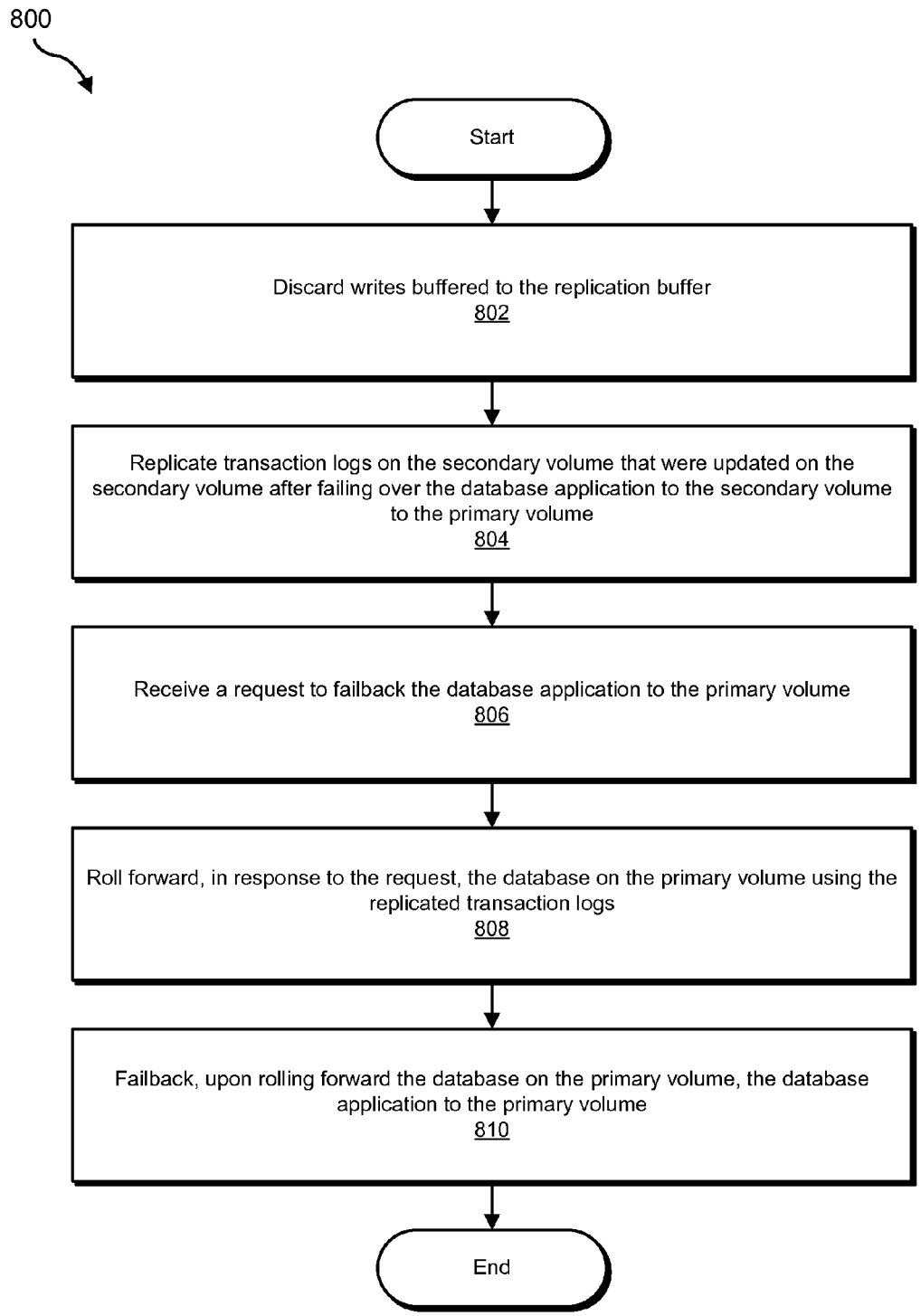
FIG. 8 is a flow diagram of an exemplary method for enabling database disaster recovery using replicated volumes.

FIGS. 6-8 illustrate how one or more of the systems described herein may perform replication in a way that enables a database application to quickly failback from a secondary volume to a primary volume. The following discussion of FIGS. 6-8 provides an example of how, prior to the failure of database application 160, one or more of the systems described herein may (1) replicate writes to transaction log 140, archived transaction log 144, and control file 150 to secondary volume 132 in a way that keeps the state of secondary volume 132 ahead of the state of primary volume 130 and that enables one or more of the systems described herein to, upon the recovery of primary volume 130 on server 202 in FIG. 2, resynchronize (e.g., begin replicating) secondary volume 132 with primary volume 130 without first having to rollback database 120 (e.g., resynchronizing secondary volume 132 after it has taken on the role of a primary volume with primary volume 130 after it has taken on the role of a secondary volume) and (2) failback database application 160 to primary volume 130 on server 202 as illustrated by exemplary system 200 in FIG. 2.

In some scenarios after failing over a database application to a secondary volume, it may be desirable to return the database application to the original primary volume. If the primary volume had been synchronously replicated to the secondary volume then at the time that the database application failed, the primary volume and the secondary volume may be identical and the database application may failback to the primary volume after the database on the primary volume has been rolled forward without first having to roll back the database on the primary volume.

On the other hand, if the primary volume was asynchronously replicated to the secondary volume, the state of the primary volume may be ahead of the state of the secondary volume. For example using traditional data replication, a write by a database application to a primary volume may first be written to the primary volume and then transmitted and replicated to a secondary volume. If the database application or the primary volume fails before the write has been replicated, the primary volume will contain the write but the secondary volume will not. If the database application then fails over to the secondary volume and begins to write to the secondary volume, the write may be lost and the changes made to the primary volume by the write may need to be rolled back prior to resynchronizing the primary volume with the secondary volume. As will be described in greater detail below, to eliminate the need to roll back the write, one or more of the systems described herein may replicate the primary volume to the secondary volume in a way that causes the state of the primary volume to lag behind that of the state of the secondary volume.

FIG. 6 is a flow diagram of an exemplary computer-implemented method 600 for performing replication in a way that enables a database application to failback to a primary volume without rolling back a database on the primary volume by holding writes to the primary volume in a replication buffer until an acknowledgement is received that indicates that the writes have been replicated to a secondary volume. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, system 400 in FIG. 4, computing system 910 in FIG. 9, and/or portions of exemplary network architecture 1000 in FIG. 10.

The steps shown in FIG. 6 may be performed in a variety of ways. FIG. 7 is an exemplary flow diagram that illustrates how modules 102(a) and replication buffer 170 on server 202 in FIG. 2 and modules 102(b) on server 206 in FIG. 2 may enable database application 160 to failback to primary volume 130 without having to first roll back database 120 on primary volume 130.

At step 602, one or more of the systems described herein may intercept the write to the database on the primary volume and the write to the transaction log on the primary volume. For example, at step 602 replication module 110 may, as part of server 202 in FIG. 2, intercept the write to database 120 on primary volume 130 and the write to transaction log 140 on primary volume 130.

The systems described herein may perform step 602 in any suitable manner. In one example, replication module 110 may intercept all writes to primary volume 130. For example, replication module 110 may represent a portion of a volume manager that communicates directly with a database application and/or that provides storage to the database application. In this example, replication module 110 may manage writes to and reads from primary volume 130 for database application 160 and may intercept each write made by database application 160. For example, as shown in FIG. 7, replication module 110 may, as part of server 202, intercept a write (step 702) (e.g., a write to database 120, transaction log 140, archived transaction log 144, or control file 150).

At step 604, one or more of the systems described herein may buffer the write to the database and the write to the transaction log to a replication buffer. For example, at step 604 replication module 110 may, as part of server 202 in FIG. 2, buffer the write intercepted at step 602 to replication buffer 170.

The systems described herein may perform step 604 in any suitable manner. In one example, replication module 110 may buffer the write to primary volume 130 to replication buffer 170, acknowledge to database application 160 that the write was successful, and then transfer the write (e.g., if the write was to transaction log 140, archived transaction log 144, or control file 150) to server 206 to be replicated to secondary volume 132. For example, as shown in FIG. 7, replication module 110 may, as part of server 202, buffer (step 704) the write intercepted at step 702 to replication buffer 170, acknowledge (step 706) to database application 160 that the write was successful, and transmit (step 708) the write to server 206 to be replicated to secondary volume 132. In various examples, steps 704, 706, and 708 may be performed in an alternative order and/or simultaneously. Even though writes to database 120 may not be replicated to secondary volume 132, the writes may still be intercepted and buffered to replication buffer 170.

Additionally and/or alternatively, replication module 110 may track the order of writes buffered to replication buffer 170. For example, replication module 110 may track the order of a write buffered to replication buffer 170 by associating a sequence identifier (e.g., a serial number) to the write. In at least one example, replication module 110 may include this sequence identifier when transferring the write to server 206. The sequence identifier may be used to ensure the write is committed to secondary volume 132 in the same order that the write was buffered to replication buffer 170.

Returning to FIG. 6 at step 606, one or more of the systems described herein may determine that the write to the transaction log has been replicated to the secondary volume. For example, at step 606 replication module 110 may, as part of server 202 in FIG. 2, determine that the write to transaction log 140 has been replicated to secondary volume 132.

The systems described herein may perform step 606 in any suitable manner. For example, as shown in FIG. 7, replication module 110 may, as part of server 206, receive the write sent at step 708, commit (step 710) the write to secondary volume 132, and acknowledge (step 712) to server 202 that the write was successfully replicated to secondary volume 132. In this example, replication module 110 may, as part of server 202, determine that the write to transaction log 140 has been replicated to secondary volume 132 upon receiving the acknowledgement sent as part of step 712. In at least one example, replication module 110 may, as part of server 206, buffer the write to a replication buffer (e.g., a replication buffer similar to replication buffer 170) and then acknowledge that the write was successfully replicated to secondary volume 132 before the write has been committed to secondary volume 132.

Returning to FIG. 6 at step 608, one or more of the systems described herein may flush the write to the database and the write to the transaction log to the primary volume. For example, at step 608 replication module 110 may, as part of server 202 in FIG. 2, flush the write to database 120 and the write to transaction log 140 to primary volume 130.

The systems described herein may perform step 608 in any suitable manner. For example, as shown in FIG. 7, replication module 110 may retrieve (step 714) the write from replication buffer 170 and commit (step 716) the write to primary volume 130. By waiting to flush writes to primary volume 130 until after the writes are written to secondary volume 132, the systems described herein may cause the state of primary volume 130 to lag behind that of the state of primary volume 130 thereby eliminating the need to roll back database 120 prior to failing back database application 160 to primary volume 130. Upon completion of step 608, exemplary method 600 in FIG. 6 may terminate.

As a result of buffering writes to replication buffer 170, primary volume 130 may not contain every write that database application 160 has attempted to write to database 120, transaction log 140, archived transaction log 144, and/or control file 150. Instead, some of the writes that database application 160 attempted to write to primary volume 130 may be stored to replication buffer 170. For this reason, in at least one example a subsequent request (e.g., by database application 160) to read from database 120, transaction log 140, archived transaction log 144, and/or control file 150 may be serviced at least in part from replication buffer 170. Similarly, if a snapshot of primary volume 130 is created, the snapshot may not include every write that database application 160 has attempted to write to primary volume 130. For this reason, database module 106 may create a snapshot of replication buffer 170 whenever a snapshot of primary volume 130 is created. For example, database module 106 may (1) receive a request to create a snapshot of primary volume 130 and (2) create the snapshot of primary volume 130 and a snapshot of replication buffer 170 in response to the request to create the snapshot of primary volume 130. A snapshot of primary volume 130 may include a snapshot of all or a portion of primary volume 130.

In some examples, replication buffer 170 may have a fixed size and may possibly overflow (e.g., because of network connectivity issues). In these examples, replication module 110 may ensure that database application 160 may quickly failback to primary volume 130 by creating a snapshot of database 120 before replication buffer 170 overflows. This snapshot may later be used to roll forward database 120 without having to first roll back database 120. For example, replication module 110 may (1) detect an overflow of replication buffer 170 and then (2) create a snapshot of primary volume 130 to enable resynchronization of primary volume 130 with secondary volume 132 after failing over database application 160 to secondary volume 132 by rolling forward database 120 on primary volume 130 from this snapshot of primary volume 130.

Even though replication buffer 170 overflows, modifications to transaction log 140, archived transaction log 144, and control file 150 may still be required to be replicated to secondary volume 132. For this reason, in some examples in response to detecting the overflow of the replication buffer, replication module 110 may (1) track updates to transaction log 140, archived transaction log 144, and/or control file 150 on primary volume 130 and (2) replicate any tracked updates to secondary volume 132 when possible. In one example, replication module 110 may track updates to transaction log 140, archived transaction log 144, and/or control file 150 by tracking writes to primary volume 130 using region-bitmap logging (e.g., tracking which blocks on primary volume 130 have been modified by writes to primary volume 130). As replication module 110 begins to buffer writes to replication buffer 170, replication module 110 may determine whether transaction log 140, archived transaction log 144, and/or control file 150 have been updated, and if so replicate the updates to secondary volume 132.

FIG. 8 is a flow diagram of an exemplary computer-implemented method 800 for resynchronizing the primary volume with the secondary volume after failing over the database application to the secondary volume and for failing back the database application to the primary volume. The steps shown in FIG. 8 may be performed by any suitable computer-executable code and/or computing system. In some embodiments, the steps shown in FIG. 8 may be performed by one or more of the components of system 100 in FIG. 1, system 200 in FIG. 2, system 400 in FIG. 4, computing system 910 in FIG. 9, and/or portions of exemplary network architecture 1000 in FIG. 10.

At step 802, one or more of the systems described herein may discard writes buffered to the replication buffer. For example, at step 802 replication module 110 may, as part of server 202 in FIG. 2, discard writes buffered to replication buffer 170. The systems described herein may perform step 802 in any suitable manner. In one example, replication module 110 may discard writes buffered to replication buffer 170 by flushing replication buffer 170 and/or by clearing replication buffer 170.

Additionally and/or alternatively, replication module 110 may identify and discard only writes buffered to replication buffer 170 that have not yet been successfully committed to secondary volume 132. As mentioned above, in one example replication module 110 may track the order of writes buffered to replication buffer 170 using sequence identifiers. In this example, replication module 110 may identify and discard only writes that have not yet been successfully committed to secondary volume 132 by (1) identifying (e.g., by querying server 206) the sequence identifier associated with the last write that was successfully committed to secondary volume 132 and (2) discarding all writes buffered to replication buffer 170 associated with sequence identifiers greater than the identified sequence identifier. In at least one example, replication module 110 may flush the remaining writes buffered to replication buffer 170 to primary volume 130.

At step 804, one or more of the systems described herein may replicate transaction logs on the secondary volume that were updated on the secondary volume after failing over the database application to the secondary volume to the primary volume to enable the database application to failback to the primary volume by rolling forward the database on the primary volume using the replicated transaction logs. For example, at step 804 replication module 110 may, as part of server 206 in FIG. 2, replicate transaction logs on secondary volume 132 that were updated on secondary volume 132 after failing over database application 160 to secondary volume 132 to primary volume 130 to enable database application 160 to failback to primary volume 130 by rolling forward database 120 on primary volume 130 using these replicated transaction logs.

The systems described herein may perform step 804 in any suitable manner. In one example, replication module 110 may, in response to failing over database application 160 to secondary volume 132, track modifications to replicated transaction log 142, replicated archived transaction log 146, and/or replicated control file 152 on secondary volume 132 and, upon determining that primary volume 130 has been restored replicating these modifications to primary volume 130.

In at least one example, upon replicating transaction logs on secondary volume 132 that were updated on secondary volume 132 after failing over database application 160 to secondary volume 132 to primary volume 130, one or more of the systems described herein may continue to replicate writes to secondary volume 132 to primary volume 130 as described in steps 302-308 in FIG. 3. Step 804 is similar to steps 302-308, therefore, the discussion of steps 302-308 may also apply to step 804.

At step 806, one or more of the systems described herein may receive a request to failback the database application to the primary volume. The systems described herein may perform step 806 in any suitable manner. For example, at step 806 database module 106 may, as part of server 202 in FIG. 2, receive a request from an administrator to failback database application 160 to primary volume 130. In another example, database module 106 may receive the request to failback database application 160 to primary volume 130 via a configuration file.

At step 808, one or more of the systems described herein may roll forward, in response to the request, the database on the primary volume using the replicated transaction logs. The systems described herein may perform step 808 in any suitable manner. For example, at step 808 database module 106 may, as part of server 202 in FIG. 2, roll forward database 120 on primary volume 130 using the replicated transaction logs. Step 808 is similar to step 504 in FIG. 5, therefore, the discussion of step 504 may also apply to step 808.

At step 810, one or more of the systems described herein may failback, upon rolling forward the database on the primary volume, the database application to the primary volume. The systems described herein may perform step 810 in any suitable manner. For example, at step 810 database module 106 may, as part of server 202 in FIG. 2, failback database application 160 to primary volume 130. Step 810 is similar to step 506 in FIG. 5, therefore, the discussion of step 506 may also apply to step 810. Upon completion of step 810, exemplary method 800 in FIG. 8 may terminate.

As explained above, by selectively replicating primary volumes containing database components to secondary volumes, the systems and methods described herein may reduce the amount of data that is replicated to secondary volumes to enable a database to be quickly and efficiently recovered from the secondary volumes. For example, by selectively replicating only changes to transaction logs on primary volumes to secondary volumes, the systems and methods described herein may enable database applications to failover to secondary volumes without needing to replicate changes to the databases associated with these transaction logs. Furthermore, in some examples, by ensuring that writes to databases and/or transaction logs are first committed to secondary volumes before they are committed to primary volumes, these systems and methods may enable databases to be quickly and efficiently recovered from the primary volumes.

Figure 9:
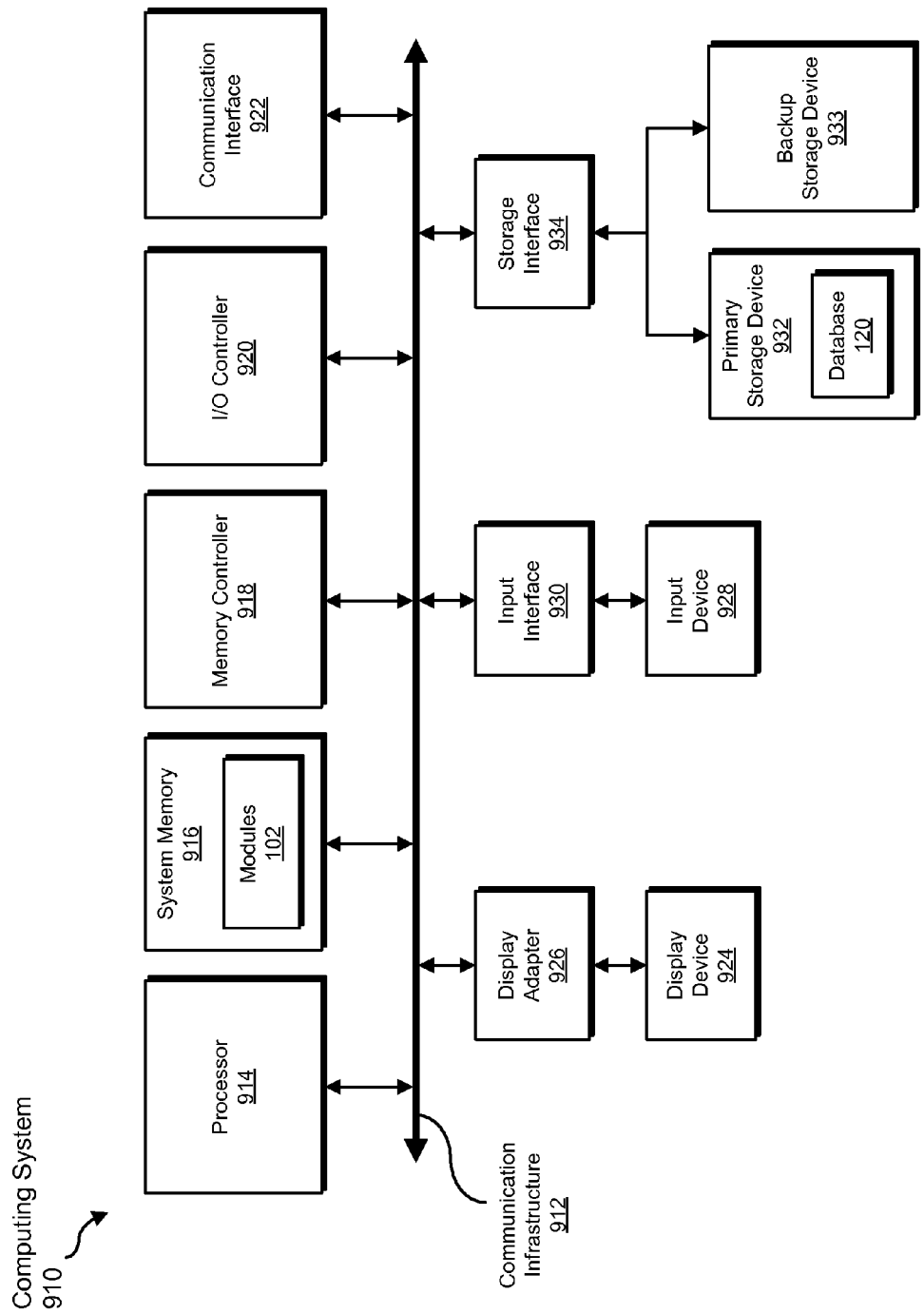
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the identifying, detecting, replicating, recovering, failing over, enabling, intercepting, buffering, determining, flushing, resynchronizing, discarding, receiving, rolling forward, failing back, creating, tracking, and archiving steps described herein. All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 910. All or a portion of the computer program stored on the computer-readable-storage medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
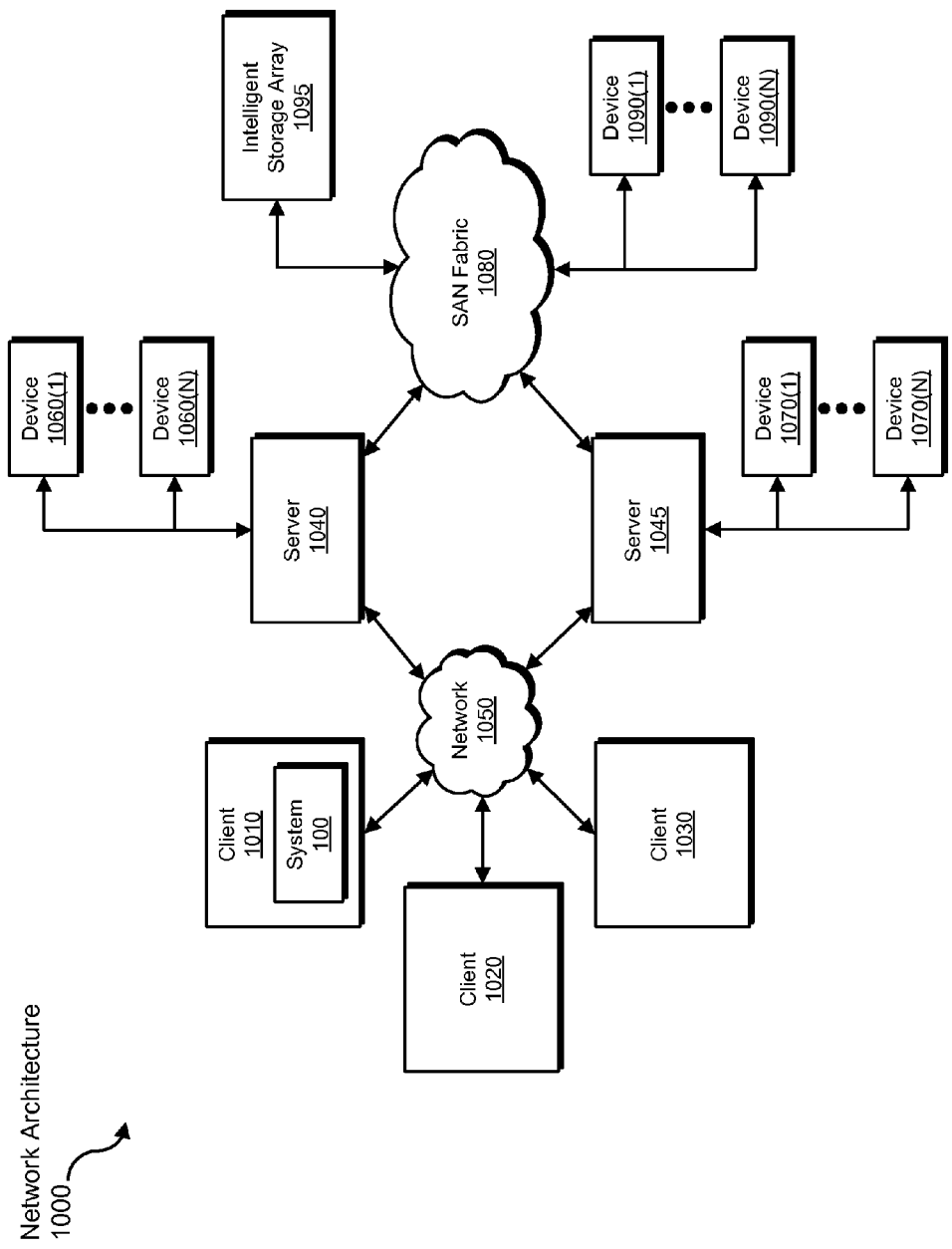
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the identifying, detecting, replicating, recovering, failing over, enabling, intercepting, buffering, determining, flushing, resynchronizing, discarding, receiving, rolling forward, failing back, creating, tracking, and archiving steps disclosed herein. All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for enabling database disaster recovery using replicated volumes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request, by a database application, to write to a database on a primary volume that has been replicated to a secondary volume, detect that the write to the database has been recorded via a write to a transaction log on the primary volume, transform the write to the transaction log on the primary volume to a write to a replicated transaction log on the secondary volume, use the write to the replicated transaction log on the secondary volume to roll forward a replicated database on the secondary volume, and failover the database application to the secondary volume. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling database disaster recovery using replicated volumes, at least a portion of the method being performed by a computing device comprising at least one processor, the method comprising:
   identifying at least one primary volume that is replicated to at least one secondary volume by a volume-replication application using block-level replication, wherein:
      the primary volume comprises:
         a database to which a database application stores data;
         a transaction log of the database to which the database application records transactions pending on the database;
      the secondary volume comprises:
         a replicated database that comprises a copy of an initial state of the database;
         a replicated transaction log that comprises a copy of an initial state of the transaction log of the database;
   enabling, without replicating writes to the database to the replicated database, the replicated database to be rolled forward to a subsequent state of the database such that the database application may failover to the secondary volume by:
      detecting an attempt by the database application to write to the database on the primary volume;
      detecting a write to the transaction log of the database on the primary volume by the database application, wherein the write to the transaction log updates the transaction log to reflect the write to the database on the primary volume;
      causing the volume-replication application to replicate the write to the transaction log to the replicated transaction log on the secondary volume while also causing the volume-replication application to not replicate the write to the database to the replicated database on the secondary volume such that after the write to the transaction log is replicated to the replicated transaction log on the secondary volume:
         the replicated transaction log comprises a copy of a subsequent state of the transaction log;
         the replicated database still comprises the copy of the initial state of the database;
         the replicated transaction log may be used to roll forward the replicated database to the subsequent state of the database.

2. The method of claim 1, wherein causing the volume-replication application to replicate the write to the transaction log to the replicated transaction log on the secondary volume comprises causing the volume-replication application to replicate changes to a control file of the database on the primary volume to the secondary volume, wherein the control file indicates how the replicated transaction log should be used to roll forward the replicated database on the secondary volume prior to failing over the database application to the secondary volume.

3. The method of claim 1, further comprising:
   detecting a failure of the database application;
   recovering, in response to detecting the failure of the database application, the write to the database to the replicated database on the secondary volume by rolling forward the replicated database on the secondary volume using the write to the transaction log that was replicated to the replicated transaction log on the secondary volume;
   failing over, upon recovering the write to the database, the database application to the secondary volume.

4. The method of claim 3, further comprising enabling, prior to failing over the database application to the secondary volume, the database application to failback to the primary volume without rolling back the database on the primary volume by:
   intercepting the write to the database on the primary volume and the write to the transaction log on the primary volume;
   buffering the write to the database and the write to the transaction log to a replication buffer;
   determining that the write to the transaction log has been replicated to the secondary volume;
   flushing, in response to the determination, the write to the database and the write to the transaction log to the primary volume.

5. The method of claim 4, wherein:
   failure of the database application occurs before the write to the database and the write to the transaction log have been flushed to the primary volume;
   further comprising resynchronizing, after failing over the database application to the secondary volume, the primary volume with the secondary volume by:
      discarding writes buffered to the replication buffer;
      replicating transaction logs on the secondary volume that were updated on the secondary volume after failing over the database application to the secondary volume to the primary volume to enable the database application to failback to the primary volume by rolling forward the database on the primary volume using the replicated transaction logs.

6. The method of claim 5, further comprising:
receiving a request to failback the database application to the primary volume;
rolling forward, in response to the request, the database on the primary volume using the replicated transaction logs;
failing back, upon rolling forward the database on the primary volume, the database application to the primary volume.

7. The method of claim 4, further comprising:
receiving a request to create a snapshot of the primary volume;
creating, in response to the request to create the snapshot of the primary volume, the snapshot of the primary volume and a snapshot of the replication buffer.

8. The method of claim 4, further comprising:
detecting an overflow of the replication buffer;
creating, in response to detecting the overflow of the replication buffer, a snapshot of the primary volume to enable resynchronization of the primary volume with the secondary volume after failing over the database application to the secondary volume by rolling forward the database on the primary volume from the snapshot of the primary volume.

9. The method of claim 8, further comprising:
tracking, in response to detecting the overflow of the replication buffer, updates to transaction logs on the primary volume;
replicating updated transaction logs to the secondary volume.

10. The method of claim 1, further comprising:
detecting that the database application has archived the transaction log on the primary volume by creating a copy of the transaction log on the primary volume;
archiving, in response to detecting that the database application has archived the transaction log on the primary volume, the replicated transaction log on the secondary volume by creating a copy of the replicated transaction log on the secondary volume.

11. The method of claim 1, wherein:
identifying the primary volume that is replicated to the secondary volume comprises causing the volume-replication application to perform an initial replication of the database to the secondary volume such that:
the database on the primary volume and the replicated database on the secondary volume contain identical data;
the transaction log on the primary volume and the replicated transaction log on the secondary volume contain identical data;
causing the volume-replication application to not replicate the write to the database to the replicated database on the secondary volume comprises causing the volume-replication application to not update the replicated database on the secondary volume to reflect writes to the database on the primary volume such that the replicated database on the secondary volume does not change after the initial replication of the database to the secondary volume until after a failure of the database application is detected.

12. A system for enabling database disaster recovery using replicated volumes, the system comprising:
an identification module programmed to identify at least one primary volume that is replicated to at least one secondary volume by a volume-replication application using block-level replication, wherein:
the primary volume comprises:
a database to which a database application stores data;
a transaction log of the database to which the database application records transactions pending on the database;
the secondary volume comprises:
a replicated database that comprises a copy of an initial state of the database;
a replicated transaction log that comprises a copy of an initial state of the transaction log of the database;
a database module, a transaction module, and a replication module programmed to enable, without replicating writes to the database to the replicated database, the replicated database to be rolled forward to a subsequent state of the database such that the database application may failover to the secondary volume, wherein:
the database module is programmed to detect an attempt by the database application to write to the database on the primary volume;
the transaction module is programmed to detect a write to the transaction log of the database on the primary volume by the database application, wherein the write to the transaction log updates the transaction log to reflect the write to the database on the primary volume;
the replication module is programmed to:
cause the volume-replication application to replicate the write to the transaction log to the replicated transaction log on the secondary volume while also causing the volume-replication application to not replicate the write to the database to the replicated database on the secondary volume such that after the write to the transaction log is replicated to the replicated transaction log on the secondary volume:
the replicated transaction log comprises a copy of a subsequent state of the transaction log;
the replicated database still comprises the copy of the initial state of the database;
the replicated transaction log may be used to roll forward the replicated database to the subsequent state of the database;
at least one processor configured to execute the identification module, the database module, the transaction module, and the replication module.

13. The system of claim 12, wherein the database module is further programmed to:
detect a failure of the database application;
recover, in response to detecting the failure of the database application, the write to the database to the replicated database on the secondary volume by rolling forward the replicated database on the secondary volume using the write to the transaction log that was replicated to the replicated transaction log on the secondary volume;
failover, upon recovering the write to the database, the database application to the secondary volume.

14. The system of claim 13, wherein the replication module is further programmed to enable, prior to failing over the database application to the secondary volume, the database application to failback to the primary volume without rolling back the database on the primary volume by:
intercepting the write to the database on the primary volume and the write to the transaction log on the primary volume;
buffering the write to the database and the write to the transaction log to a replication buffer;

determining that the write to the transaction log has been replicated to the secondary volume;

flushing, in response to the determination, the write to the database and the write to the transaction log to the primary volume.

15. The system of claim 14, wherein:

failure of the database application occurs before the write to the database and the write to the transaction log have been flushed to the primary volume;

the replication module is further programmed to resynchronize, after failing over the database application to the secondary volume, the primary volume with the secondary volume by:

discarding writes buffered to the replication buffer;

replicating transaction logs on the secondary volume that were updated on the secondary volume after failing over the database application to the secondary volume to the primary volume to enable the database application to failback to the primary volume by rolling forward the database on the primary volume using the replicated transaction logs.

16. The system of claim 15, wherein the database module is further programmed to:

receive a request to failback the database application to the primary volume;

roll forward, in response to the request, the database on the primary volume using the replicated transaction logs;

failback, upon rolling forward the database on the primary volume, the database application to the primary volume.

17. The system of claim 14, wherein the database module is further programmed to:

receive a request to create a snapshot of the primary volume;

create, in response to the request to create the snapshot of the primary volume, the snapshot of the primary volume and a snapshot of the replication buffer.

18. The system of claim 12, wherein:

the transaction module is further programmed to detect that the database application has archived the transaction log on the primary volume by creating a copy of the transaction log on the primary volume;

the replication module is further programmed to archive, in response to detecting that the database application has archived the transaction log on the primary volume, the replicated transaction log on the secondary volume by creating a copy of the replicated transaction log on the secondary volume.

19. The system of claim 12, wherein:

the identification module identifies the primary volume that is replicated to the secondary volume by causing the volume-replication application to perform an initial replication of the database to the secondary volume such that:

the database on the primary volume and the replicated database on the secondary volume contain identical data;

the transaction log on the primary volume and the replicated transaction log on the secondary volume contain identical data;

the replication module causes the volume-replication application to not replicate the write to the database to the replicated database on the secondary volume by causing the volume-replication application to not update the replicated database on the secondary volume to reflect writes to the database on the primary volume such that the replicated database on the secondary volume does not change after the initial replication of the database to the secondary volume until after a failure of the database application is detected.

20. A non-transitory computer-readable medium comprising one or more computer-executable instructions that, when executed by at least one processor of a computing device, cause the computing device to:

identify at least one primary volume that is replicated to at least one secondary volume by a volume-replication application using block-level replication, wherein:

the primary volume comprises:

a database to which a database application stores data;

a transaction log of the database to which the database application records transactions pending on the database;

the secondary volume comprises:

a replicated database that comprises a copy of an initial state of the database;

a replicated transaction log that comprises a copy of an initial state of the transaction log of the database;

enable, without replicating writes to the database to the replicated database, the replicated database to be rolled forward to a subsequent state of the database such that the database application may failover to the secondary volume by:

detecting an attempt by the database application to write to the database on the primary volume;

detecting a write to the transaction log of the database on the primary volume by the database application, wherein the write to the transaction log updates the transaction log to reflect the write to the database on the primary volume;

causing the volume-replication application to replicate the write to the transaction log to the replicated transaction log on the secondary volume while also causing the volume-replication application to not replicate the write to the database to the replicated database on the secondary volume such that after the write to the transaction log is replicated to the replicated transaction log on the secondary volume:

the replicated transaction log comprises a copy of a subsequent state of the transaction log;

the replicated database still comprises the copy of the initial state of the database;

the replicated transaction log may be used to roll forward the replicated database to the subsequent state of the database.

\* \* \* \* \*